No. 796,118. PATENTED AUG. 1, 1905.
J. B. DURYEA.
FISH CULTURE TANK.
APPLICATION FILED JAN. 19, 1905.

WITNESSES
M. Van Housl.
B. Arnold

INVENTOR
John B. Duryea
BY
P. J. Elliott
his ATTORNEY

UNITED STATES PATENT OFFICE.

JOHN B. DURYEA, OF TACOMA, WASHINGTON.

FISH-CULTURE TANK.

No. 796,118.  Specification of Letters Patent.  Patented Aug. 1, 1905.

Application filed January 19, 1905. Serial No. 241,873.

*To all whom it may concern:*

Be it known that I, JOHN B. DURYEA, a citizen of the United States of America, residing at Tacoma, in the county of Pierce and State of Washington, have invented certain new and useful Improvements in Fish-Culture Tanks, of which the following is a specification, reference being had therein to the accompanying drawings.

My invention relates to devices for supplying water to fish-tanks, and is more particularly an improvement in Patent No. 757,407, and has for its object to produce a device by means of which the strength and direction of the circulating current in the tank may be varied without necessarily altering the amount of water flowing into the tank. I attain this object by the device illustrated in the accompanying drawings, in which—

Figure 1:
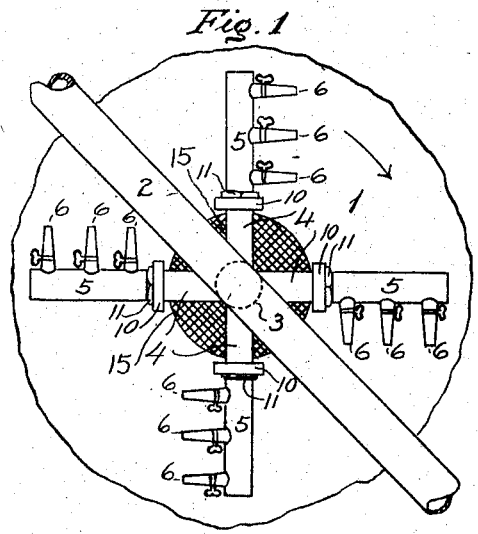
Figure 4:
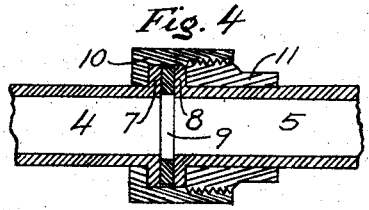
Figure 2:
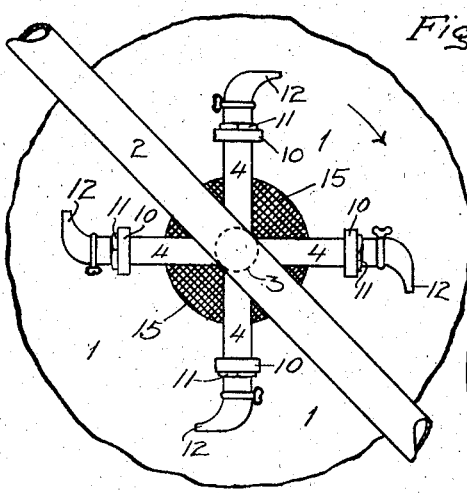
Figure 3:
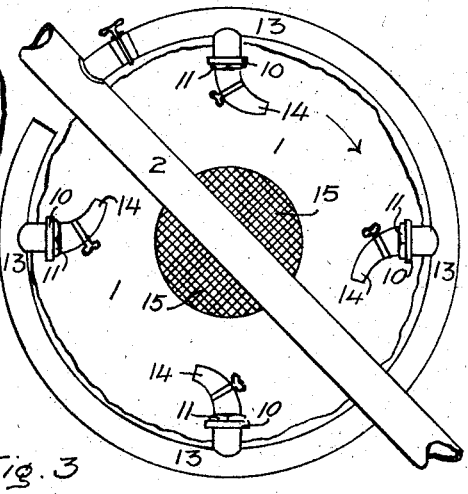

Figure 1 is a plan of one form of my water-supply device. Fig. 2 is a similar view of another form thereof, and Fig. 3 is a similar view of another variation. Fig. 4 is a longitudinal section of a pipe, showing the rotatable joint; and Fig. 5 is a cross-section thereof at one of the nozzles.

Similar numerals of reference refer to similar parts thoughout the several views.

It has been found that a current which is invariable in strength and direction day and night soon tires the young fish in the tank. In my invention I supply the tank or pond 1 with water from a main supply-pipe 2 (which may lead to a series of similar tanks) by way of a connecting-pipe 3, (shown in dotted lines in Figs. 1 and 2,) which is supported directly over the center of the tank. This pipe 3 terminates in a series of horizontally-radiating pipes 4. Each of these pipes 4 connects, through an adjustable joint, with the nozzle-pipe 5. These nozzle-pipes 5 have a series of parallel nozzles 6 leading from them and from which the water is admitted into the tank. Since all the nozzles 6 on one pipe 5 are formed in one line, it is evident that if the pipe 5 is rotated through an angle the angle of incidence of the falling water on the water in the pond will be changed and the resulting rotating force will be altered, so that the speed of the current in the pond will be correspondingly adjusted. If the pipes 5 are rotated so that the nozzles 6 are vertical, there will be no rotation of the water in the tank, and if it is further rotated the current in the tank will be reversed. Thus by simply turning the pipes 5 on their axes the current in the tank may be perfectly controlled without altering the amount of water flowing into said tank.

Figure 5:
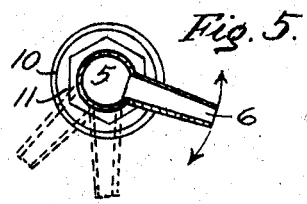

In Figs. 4 and 5 I have illustrated one form of connection between the pipes 4 and 5. In this form I have shown the pipe 4 with a flange 7 formed on its end and a similar flange 8 formed on the adjacent end of the pipe 5. Between these flanges 7 and 8 I insert a ring of packing material 9. The pipes 4 and 5 are held together by means of the socket 10 and the inside nut 11, screwing into said socket, the said parts 10 and 11 engaging, respectively, the flanges 7 and 8 and compressing them against the packing 9. In order to rotate the pipe 5, it is only necessary to loosen the nut 11 in the socket 10 and to turn the pipe 5 and then to tighten the joint again. Many other connecting-joints could be used, provided that they allow the pipe 5 to be rotated at will and hold it from rotating of its own accord.

In Fig. 2 I have shown a variation in the form of the pipe 5. In this case I have substituted the single bent nozzle 12 for the pipe 5 with the row of nozzles 6. In all other ways this form is the same as that already described.

In Fig. 3 a further variation is illustrated in which the feed-pipe 13 carries the water from the supply-pipe 2, which it joins at a point near the edge of the tank around the tank to the nozzles 14, connecting thereto. These nozzles 14 are also rotatably secured to the pipe 13 or to extensions connected therewith by joints similar to those above described. The nozzles 14 are similar to the nozzles 12 illustrated in Fig. 2.

I have indicated that each nozzle has a valve by means of which the amount of water flowing into the tank may be controlled; but these valves may be of any suitable form. The tanks are provided with central outlet-pipes covered over with a netting 15, as indicated in the figures.

What I claim as my invention is—

1. In a fish-culture tank, the combination of a supply-pipe having radiating pipes supported over the center of the tank, and nozzle-pipes rotatably secured to said radiating pipes.

2. In a fish-culture tank, the combination of a supply-pipe having radiating pipes supported over the center of the tank, nozzle-pipes adjacent to said radiating pipes, and adjusting-joints between the ends of said radiating pipes and said nozzle-pipes whereby said nozzle pipes may be rotatably adjusted.

3. In a fish-culture tank, the combination of a feed-pipe, nozzles secured to said feed-pipe and adapted to project the water either vertically or circumferentially, and adjusting-joints between said feed-pipe and said nozzles whereby said nozzles my be rotatably adjusted.

In testimony whereof I affix my signature in presence of two witnesses.

JOHN B. DURYEA.

Witnesses:
   HAVELOCK C. BOYLE,
   L. R. DAUGHMBOUGH.